United States Patent
Sallee et al.

(10) Patent No.: US 11,816,186 B2
(45) Date of Patent: Nov. 14, 2023

(54) ARCHITECTURE FOR DYNAMIC ML MODEL DRIFT EVALUATION AND VISUALIZATION ON A GUI

(71) Applicant: Raytheon Company, Waltham, MA (US)

(72) Inventors: Philip A. Sallee, South Riding, VA (US); Franklin Tanner, Ashburn, VA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/385,443

(22) Filed: Jul. 26, 2021

(65) Prior Publication Data

US 2023/0025677 A1    Jan. 26, 2023

(51) Int. Cl.
  *G06F 18/21*    (2023.01)
  *G06F 3/0484*   (2022.01)
  *G06N 3/08*     (2023.01)

(52) U.S. Cl.
  CPC .......... *G06F 18/217* (2023.01); *G06F 3/0484* (2013.01); *G06N 3/08* (2013.01)

(58) Field of Classification Search
  CPC .............. G06F 3/0484; G06F 3/04847; G06F 16/24568; G06F 16/9024; G06F 18/214; G06F 18/217; G06F 18/2178; G06F 18/2193; G06K 9/6262; G06K 9/6265; G06N 3/08; G06N 20/00; G06N 20/10; G06N 20/20; G06N 7/01; G06N 3/047; G06T 11/206
  See application file for complete search history.

(56) References Cited

U.S. PATENT DOCUMENTS

| | | | |
|---|---|---|---|
| 10,599,957 B2 | 3/2020 | Walters et al. | |
| 11,315,030 B2* | 4/2022 | Cataltepe | G06N 3/0445 |
| 11,443,140 B2* | 9/2022 | Hellman | G06F 18/2148 |
| 11,537,506 B1* | 12/2022 | Dasgupta | G06F 11/1476 |

(Continued)

FOREIGN PATENT DOCUMENTS

| | | | | |
|---|---|---|---|---|
| CN | 101827002 A | * | 9/2010 | |
| CN | 108170695 A | * | 6/2018 | ....... G06F 16/24568 |

(Continued)

OTHER PUBLICATIONS

Y. Ma, T. Xie, J. Li and R. Maciejewski, "Explaining Vulnerabilities to Adversarial Machine Learning through Visual Analytics," in IEEE Transactions on Visualization and Computer Graphics, vol. 26, No. 1, pp. 1075-1085, Jan. 2020, doi: 10.1109/TVCG.2019. 2934631. (Year: 2020).*

(Continued)

*Primary Examiner* — Andrew L Tank
(74) *Attorney, Agent, or Firm* — Schwegman Lundberg & Woessner, P.A.

(57) ABSTRACT

Systems, devices, methods, and computer-readable media for evaluation and visualization of machine learning data drift. A method can include receiving a series of data indicating accuracy and confidence associated with classification of respective batches of input samples, and dynamically displaying, on the GUI, a concurrent plot of the accuracy and confidence as the series of data are received.

20 Claims, 5 Drawing Sheets

(56) References Cited

U.S. PATENT DOCUMENTS

| | | | |
|---|---|---|---|
| 2012/0158623 A1* | 6/2012 | Bilenko | G06N 20/00 706/12 |
| 2016/0071027 A1 | 3/2016 | Brand et al. | |
| 2017/0255874 A1* | 9/2017 | Chafle | G06N 20/10 |
| 2017/0330109 A1* | 11/2017 | Maughan | G06N 5/04 |
| 2019/0102683 A1* | 4/2019 | Jayaraman | G06N 5/022 |
| 2020/0097847 A1* | 3/2020 | Convertino | G06F 16/904 |
| 2020/0118019 A1* | 4/2020 | Sengupta | G06F 16/9024 |
| 2020/0134368 A1* | 4/2020 | Chopra | G06N 5/003 |
| 2020/0175416 A1* | 6/2020 | Zhao | G06N 20/00 |
| 2020/0226321 A1* | 7/2020 | Burns | G16H 40/20 |
| 2021/0110288 A1* | 4/2021 | Poothiyot | G06F 8/20 |
| 2021/0117760 A1* | 4/2021 | Krishnan | G06V 10/82 |
| 2021/0133632 A1* | 5/2021 | Elprin | G06F 11/3409 |
| 2021/0287081 A1* | 9/2021 | Saito | G06N 3/08 |
| 2021/0406780 A1* | 12/2021 | Lesner | G06F 18/285 |
| 2022/0036201 A1* | 2/2022 | Tamir | G06N 5/003 |
| 2022/0405570 A1* | 12/2022 | Vadera | G06N 3/045 |

FOREIGN PATENT DOCUMENTS

| | | | | |
|---|---|---|---|---|
| EP | 3812974 A1 * | 4/2021 | | G06K 9/6267 |
| WO | WO-2021044192 A1 | 3/2021 | | |

OTHER PUBLICATIONS

X. Wang et al., "ConceptExplorer: Visual Analysis of Concept Drifts in Multi-source Time-series Data," 2020 IEEE Conference on Visual Analytics Science and Technology (VAST), 2020, pp. 1-11, doi: 10.1109/VAST50239.2020.00006. (Year: 2020).*

Ackerman, Samuel et al. "Automatically detecting data drift in machine learning classifiers." ArXiv abs/2111.05672 (2021): n. pag. (Year: 2021).*

Yang, Weikai et al. "Diagnosing Concept Drift with Visual Analytics." 2020 IEEE Conference on Visual Analytics Science and Technology (VAST) (2020): 12-23. arXiv:2007.14372 (Year: 2020).*

Yuan, Jun et al. "A Survey of Visual Analytics Techniques for Machine Learning." Comput. Vis. Media 7 (2021): 3-36. arXiv: 2008.09632 (Year: 2021).*

J. Wexler, M. Pushkarna, T. Bolukbasi, M. Wattenberg, F. Viégas and J. Wilson, "The What-If Tool: Interactive Probing of Machine Learning Models," in IEEE Transactions on Visualization and Computer Graphics, vol. 26, No. 1, pp. 56-65, Jan. 2020, doi: 10.1109/TVCG.2019.2934619. (Year: 2020).*

Guo, Chuan, et al. "On calibration of modern neural networks." International conference on machine learning. PMLR, 2017, https://doi.org/10.48550/arxiv.1706.04599 (Year: 2017).*

D. Ren, S. Amershi, B. Lee, J. Suh and J. D. Williams, "Squares: Supporting Interactive Performance Analysis for Multiclass Classifiers," in IEEE Transactions on Visualization and Computer Graphics, vol. 23, No. 1, pp. 61-70, Jan. 2017, doi: 10.1109/TVCG.2016. 2598828 (Year: 2017).*

Paka, Amit, "How to Detect Model Drift in ML Monitoring", Retrieved online. URL: <https://blog.fiddler.ai/2020/08/how-to-detect-data-drift/> (Aug. 20, 2020), 8 pgs.

* cited by examiner

ARCHITECTURE FOR DYNAMIC ML MODEL DRIFT EVALUATION AND VISUALIZATION ON A GUI

BACKGROUND

Machine learning (ML) systems are subject to performance degradation due to data and concept drift, including adversarial drift. It is difficult, however, to evaluate the potential impact of drift on an ML model or to anticipate the behavior of an ML model under varying types and degrees of data drift. Detection and characterization of gradual drift, drift that is slowly changing over time, is particularly difficult.

DETAILED DESCRIPTION

The following description and the drawings sufficiently illustrate teachings to enable those skilled in the art to practice them. Other embodiments may incorporate structural, logical, electrical, process, and other changes. Portions and features of some examples may be included in, or substituted for, those of other examples. Teachings set forth in the claims encompass all available equivalents of those claims.

For operational artificial intelligence (AI) and continuous integration and deployment (CI/CD) of ML models, drift can be evaluated on operational data. Known performance metrics of the ML model can provide an indication of model drift. Ground truth or predictive labeling can, additionally or alternatively, provide an indication of model drift. Existing approaches re-evaluate networks during operation to assess performance and potentially retrain the ML model or redeploy the ML model if specified performance thresholds are not met.

Monitoring performance and expected performance under operational conditions is an important part of ML operations, but current technologies to support this are limited. Embodiments provide an evaluation, visualization, and monitoring architecture for one or more ML models to assess and compare model performance under varying types and amounts of drift. Components of embodiments can include a graphical user interface (GUI) that provides a visualization of at least one of a) a time series plotting of accuracy and model confidence per batch, b) controls for a user to introduce various forms of distortion-based drift within the dataset, c) controls for additional training/retraining of the ML model, or 4) for some models, such as those employing a latent-space clustering layer for drift robustness, a scatterplot visualization of class clusters within a projection of the feature space.

Embodiments can provide one or more of 1) plot of accuracy and confidence per batch to monitor the effects of drift, 2) interactive evaluation of model performance under varying drift conditions, or 3) visualization of classification performance both temporally and within a spatial view plotted using quantities extracted from the data and/or computed by the model. These capabilities are not a part of any current known frameworks that support ML operations and evaluation. Embodiments can provide an important capability in a space of ML development and operationalization.

Figure 1:
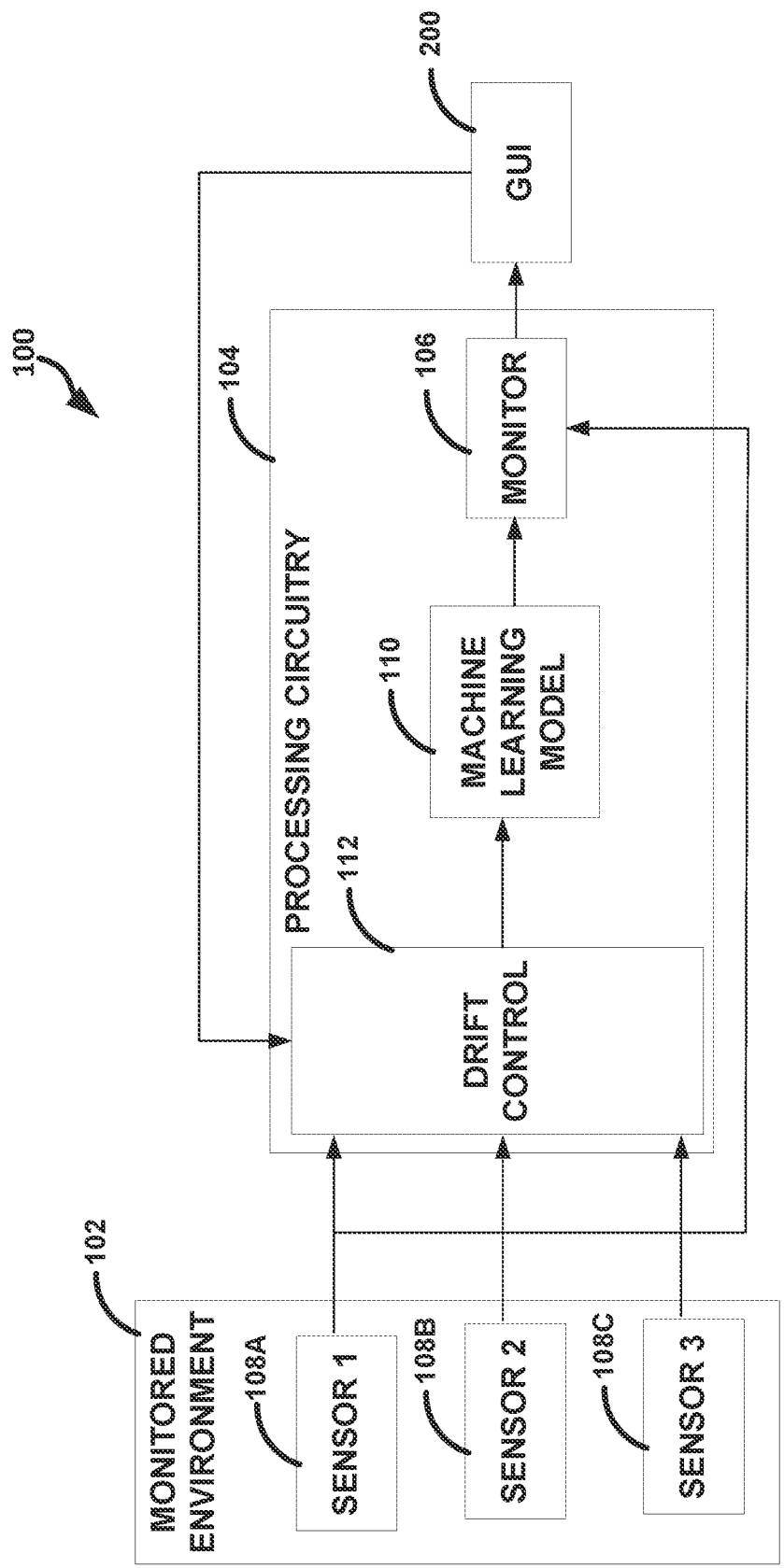
FIG. 1 illustrates, by way of example, a block diagram of an embodiment of a system for ML drift evaluation and visualization.

FIG. 1 illustrates, by way of example, a block diagram of an embodiment of a system 100 for ML drift evaluation and visualization. The system 100 as illustrated includes a monitored environment 102, processing circuitry 104, an ML model monitor 106, and a graphical user interface (GUI) 200. More details regarding the GUI 200 are provided regarding FIG. 2 and elsewhere herein. The processing circuitry 104 can be configured to receive data from sensors 108A, 108B, 108C in the monitored environment 102. The processing circuitry 104 can provide the data from the sensors 108A-108C (or data derived from the data from the sensors 108A-108C) to an ML model 110 that classifies the data. The monitor 106 can receive output of the ML model 110, a layer or intermediate result of the ML model 110, data from the sensor, or a combination thereof. The monitor 106 can analyze the data received. The monitor 106 can provide evaluation results to the GUI 200. The GUI 200 can provide a visualization of the evaluation results to a user.

The monitored environment 102 can be a device, a part of a device, a geographical area (e.g., land, water, air, space, or a combination thereof), a building, one or more rooms in the building, a vehicle, or a portion thereof, or the like. The monitored environment 102 is generally important for operation of an object or person.

The sensor 108A-108C can include a transducer that converts energy of one form to an electrical value. Sensors 108A-108C can be passive, active, or a combination thereof. The sensors 108A-108C can be electric, biological, chemical, or radioactive. The sensors 108A-108C can be digital or analog. Energy can be thermal, acoustic, optical, magnetic, electrical, mechanical, chemical, radioactive, biological, or the like. Example sensors include temperature sensors, proximity sensors, accelerometers, infrared (IR) sensors, pressure sensors, light sensors, ultrasonic sensors, smoke, gas, alcohol, oxygen, carbon di/monoxide, microphones, charge coupled displays (or other imaging sensor), thermistor, power of hydrogen (pH), touch sensor, color sensor, humidity sensor, tilt sensor, position, height, speed, or the like.

The processing circuitry 104 can include one or more electric or electronic components configured to train, implement, evaluate, or a combination thereof of the ML model 110. The electric or electronic components can include one or more transistors, resistors, capacitors, diodes, inductors, switches, oscillators, analog to digital converters, digital to analog converters, logic gates (e.g., AND, OR, XOR, negate, buffer, or the like), amplifiers, power supplies, memory devices, processing units (e.g., field programmable gate arrays (FPGA), central processing units (CPUs), graphics processing units (GPUs), application specific integrated circuits (ASICs), or the like), a combination thereof, or the like.

The ML model 110 can implement a technique that improves through experiencing data. Types of ML models include supervised, unsupervised, and reinforcement learning models. A supervised learning model predicts a classification given a set of predictors. The supervised learning model is typically trained using examples of respective inputs and desired respective outputs. The model receives the inputs, and through feedback (sometimes called backpropagation) learns to generate the desired output. Example supervised learning techniques includes linear regression, decision tree, random forest, artificial neural networks (ANN), logistic regression, and the like. An unsupervised learning model is typically used for clustering or grouping inputs. Example unsupervised learning techniques include a priori techniques and K-means clustering, among others. Reinforcement learning trains a model to make decisions. The model is exposed to an environment and makes decisions based on the environment. The model learns from past experience, typically by receiving a reward signal, to improve its decision making ability. Markov decision process is an example reinforcement learning technique.

The monitor 106 can receive output from the ML model 110, an intermediate result of the ML model 110 (e.g., an output of a hidden layer of the ML model 110), sensor 108A-108C output, or a combination thereof. Based on the received data, the monitor 106 can determine metrics of the ML model 110 performance. The metrics can include confidence, accuracy, input characteristics, input feature values, a combination thereof, or the like.

The GUI 200 can provide a user with a visual representation of the output of the monitor 106, input to the monitor 106, or a combination thereof. More details regarding the GUI 200 are provided regarding FIG. 2 and elsewhere.

In using the system 100 over time, the data from the sensors 108A-108C can change for a variety of reasons. These changes are called data drift. The reasons can include a change in the monitored environment 102, seasonal variation in sensor output or operation, a new sensor technology, a software update to an active sensor, an adversarial attack on the sensor or the monitored environment 102, sensor degradation (e.g., natural degradation, degradation from an attack, degradation from a non-adversarial entity, or the like), a new interpretation, such as by the monitor 106, of the sensor data, a change in sensor collection parameters, a change in mission parameters, or the like.

The changes to the data can adversely affect operation of the ML model 110. The ML model 110 can be trained based on data of a first data distribution, while the changed data can include samples that fall outside the distribution of the training data. It can be difficult to detect when the data has drifted to a point where it adversely affects model performance. ML model operators can benefit from a way to evaluate and visualize ML model performance. The operators can more proactively decide to retrain the ML model using a solution in accord with one or more embodiments.

To complicate the monitoring task, model accuracy can suffer disproportionately to model confidence. Some ML models generate a confidence value, such as a probability or likelihood, that may be used to assess the expected accuracy of a given prediction. When input data falls outside the distribution of the training data, the ML model 110 can generate inaccurate predictions y, yet report high confidence in its predictions. Providing a view of both the confidence and the accuracy of the model over time can help an operator more accurately determine whether the ML model 110 can benefit from further training or replacement.

The processing circuitry 104 can implement a drift control 112. A user (sometimes called "operator") can interact with drift controls (see FIG. 2) presented on the GUI 200 to inject drift into input samples for the ML model 110. The drift control 112 can transform the input samples in accord with input provided through the drift controls. The drift control 112, in some instantiations, can perform no operations, and thus is optional. More details regarding the drift controls and operations performed by the drift control 112 are provided regarding FIG. 2.

Figure 2:
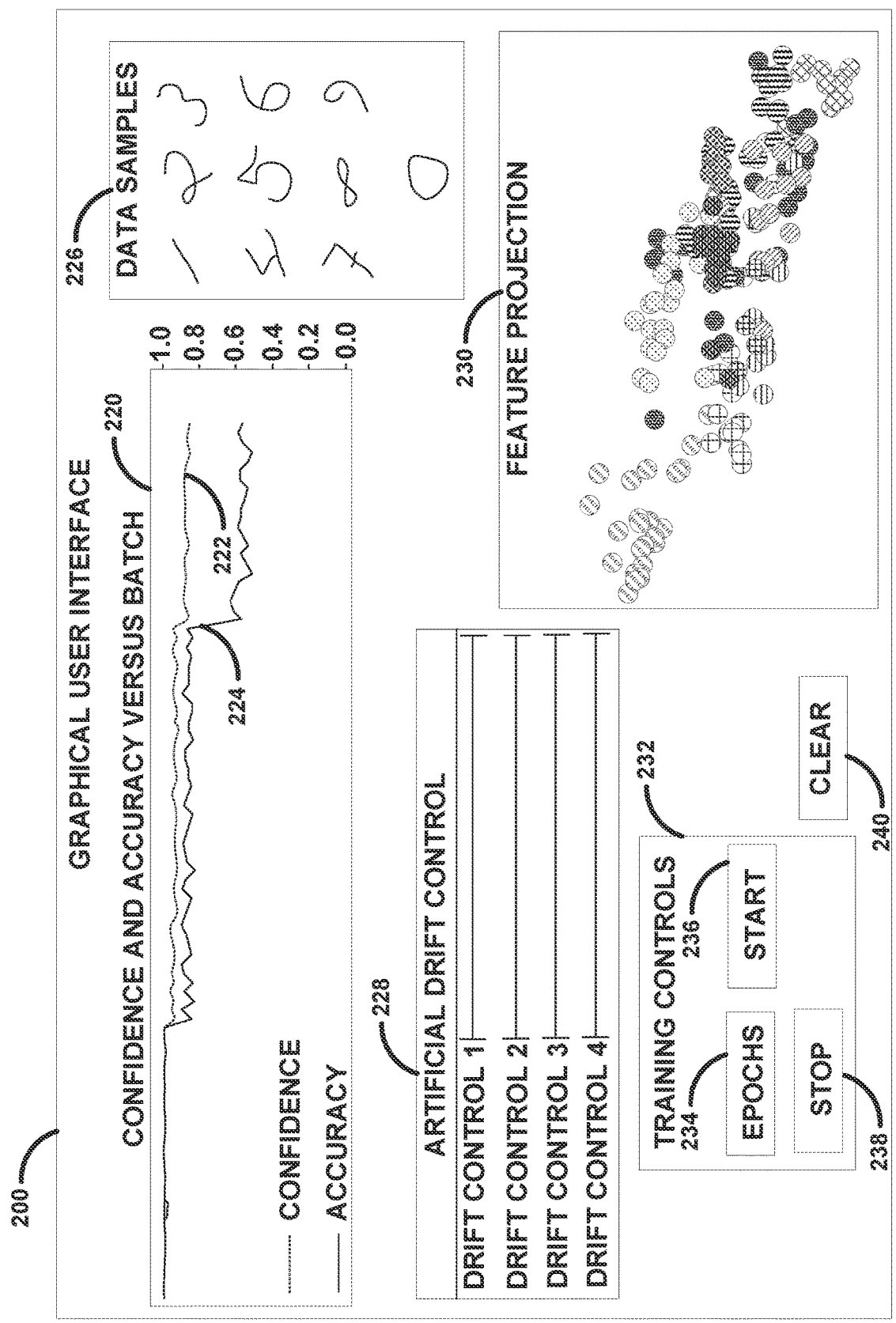
FIG. 2 illustrates, by way of example, a diagram of an embodiment of the GUI of FIG. 1.

FIG. 2 illustrates, by way of example, a diagram of an embodiment of the GUI 200. The GUI 200 as illustrated includes a plot 220 of confidence and accuracy (individually) versus time. A dotted line 222 represents confidence versus time and a solid line 224 represents accuracy versus time. In the illustrated example plot 220, the confidence of the output of the ML model 110 is eventually higher than the accuracy of the output of the ML model 110. While the visualization in reduction in accuracy can help identify data drift, a combination of a reduction in confidence and accuracy can better help an operator identify data drift and assess trustworthiness of a model.

The GUI 200, as illustrated, further includes a visualization of data samples 226. Note that a visualization of data samples is not always desired or helpful, and thus is optional. The visualization of the data samples 226 can include a view of the input that is being characterized by the ML model 110. In the example of images, the data sample 226 can simply provide a view of the images. In the example of audio samples, the data samples 226 can include a waveform view of the input, a series of phonemes determined to be present in the audio, a visual encoding of features of the input or the input, or the like.

An artificial drift control 228 is a software control that allows a user to inject drift (in the form of one or more data transformations) into input data samples. Example artificial control 228 can be accomplished using a slider bar (as illustrated), an input box that represents a strength or amount of drift, or other software control mechanism that can receive input that is applied to input before the ML model 110 operates on the input. By injecting transformations (potential data drift) into the input, the user can test how well the ML model 110 operates on data in the presence of possible drift. The user can thus evaluate how robust the ML model 110 operates in some drift scenarios and use the evaluation to determine whether to fine tune the ML model 110, generate a new ML model 110, inputs for training that will help the ML model 110 operate better in light of some drift, or a combination thereof. Examples of artificial drift for images can include rotation, scaling, stretching, twisting, pixelating, downsampling or voiding, noise injection, a combination thereof, or the like. Examples of artificial drift for audio can include prosody alteration, accent change (pitch prominence), cadence change, syllable duration, noise injection, a combination thereof, or the like. When more than one of the artificial drift controls 228 indicates a non-zero state, each of the alterations associated with the non-zero artificial drift controls can be applied to the input before being classified or otherwise operated on by the ML model 110.

A feature projection plot 230 can provide a user with a one, two, or three-dimensional view of a feature space computed from inputs to the ML model 110. A feature projection formula can map features of the input to the ML model 110, including values computed by the model on the inputs, to a one, two, or three-dimensional representation. The feature projection plot 230 can include dots, points, squares, or other symbols that are shaded, colored, shaped, or otherwise distinguished by classification. The feature projection plot 230 provides a user with a visual understanding of how well different classifications are separating in feature space. If the classifications are not separating on the plot 230, that can indicate that the ML model 110 is not trained sufficiently to separate the classes. The lack of separation in the classes can also indicate data drift. The feature projection plot 230 can further help a user visually identify outliers in the input or class spread.

Training controls 232 is a collection of software controls that can be selected or otherwise used by a user to train, retrain, fine tune, or otherwise analyze the ML model 110. The training controls 232 allow a user to specify a number of epochs to train the ML model 110, such as by entering a positive integer value into an epochs control 234. The training controls 232 allow a user to begin training, such as by selecting the start control 236. The training controls 232 allow a user to stop training, such as by using the stop control 238.

A user can train the ML model 110 by entering a positive integer (greater than 0) into the epochs control 234 and selecting the start control 236. The training can be responsive to the user identifying that the ML model 110 is to be trained to better handle drift in the input. The user can visualize the progress of the training on the plot 220 and the plot 230. The user can inject drift into the training samples, in real time, such as by using the artificial drift control 228. The user can stop training, in real time, such as by selecting the stop control 238 (even if the number of epochs indicated in the epochs control 234 has not been reached). A user can choose to stop the training if the accuracy and/or confidence of the ML model 110 is sufficient. If the number of epochs indicated by the epochs control 234 has been reached, the training of the ML model 110 can stop automatically.

A clear control 240 can be selected to re-initialize the artificial drift controls 228 to zero, clear the feature projection plot 230, clear the confidence and accuracy versus time plot 220, clear the data samples 226, or a combination thereof. The clear control 240 allows a user to provide a view of ML model 110 performance from about the time the clear control 240 was selected.

Each point of the plot 220 can represent a batch of testing. A batch of samples can be provided as input to the ML model 110. The accuracy and confidence for the batch can be recorded as a point on plot 220. The batch size can be adjusted as desired by a user.

Figure 3:
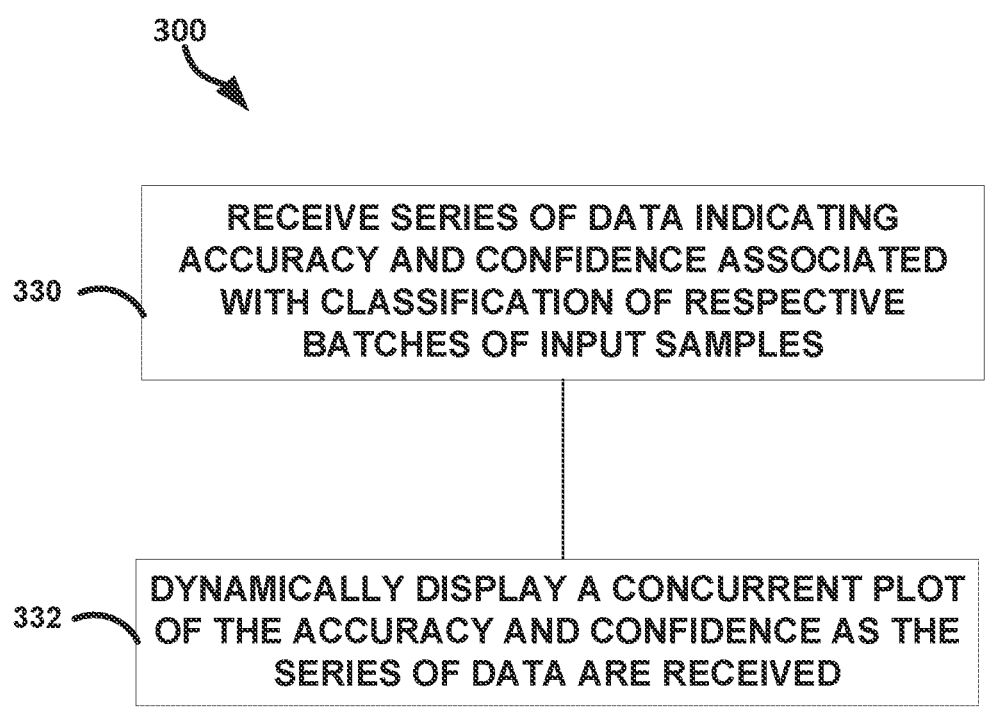
FIG. 3 illustrates, by way of example, a diagram of an embodiment of a method for evaluation and visualization of ML model data drift.

FIG. 3 illustrates, by way of example, a diagram of an embodiment of a method 300 for analysis and visualization of ML model performance. The method 300 as illustrated includes receiving a series of data indicating accuracy and confidence associated with classification of respective batches of input samples, at operation 330; and dynamically displaying a concurrent plot of the accuracy and confidence as the series of data are received, at operation 332. Dynamic, as used in this context, means a real-time or near real-time update to a view provided on a GUI to reflect the received data. Dynamic implies that the view provided by the GUI changes. Typically, changes are based on user-provided signals that include in-session behavior, model data, and model performance characteristics. The content on the GUI can adapt based on the received data.

The method 300 can further include receiving, by an artificial drift control of the GUI, data indicating a transformation. The method 300 can further include, before providing the input samples to the ML model, applying the transformation to a batch of input samples of the input samples resulting in transformed input samples. The method 300 can further include providing the transformed input samples to the ML model. The method 300 can further include receiving data indicating the confidence and accuracy of the ML model with the transformed input samples as input. The method 300 can further include dynamically displaying the plot of the accuracy and confidence to reflect the received data.

The method 300 can further include, wherein confidence and accuracy are both displayed on a same plot. The method 300 can further include dynamically displaying, concurrently with the plot of confidence and accuracy, a one, two, or three dimensional plot of a projection of feature vectors of the input. The feature vectors can be from a hidden layer of the model or featurized inputs to the model, among others. The method 300 can further include, wherein the plot of the feature vectors includes a visual encoding of the input by class.

The method 300 can further include dynamically displaying a visualization of the transformed input samples on the GUI concurrently with the plot of the confidence and accuracy. The method 300 can further include receiving, by a clear control of the GUI, data indicating to clear the plot of confidence and accuracy. The method 300 can further include dynamically clearing the plot of the accuracy and confidence to include no data points. The method 300 can further include receiving a further series of data indicating accuracy and confidence associated with classification of respective batches of input samples. The method 300 can further include dynamically displaying a concurrent plot of the accuracy and confidence as the further series of data are received.

The method 300 can further include receiving, by an epochs control of the GUI, data indicating a number of epochs to further train the ML model. The method 300 can further include receiving, by a start control of the GUI, data indicating to begin further training of the ML model. The method 300 can further include further training the ML model. The method 300 can further include receiving, by a stop control of the GUI, data indicating stop the further training of the ML model. The method 300 can further include dynamically halting the further training of the ML model irrespective of the number of epochs.

Figure 4:
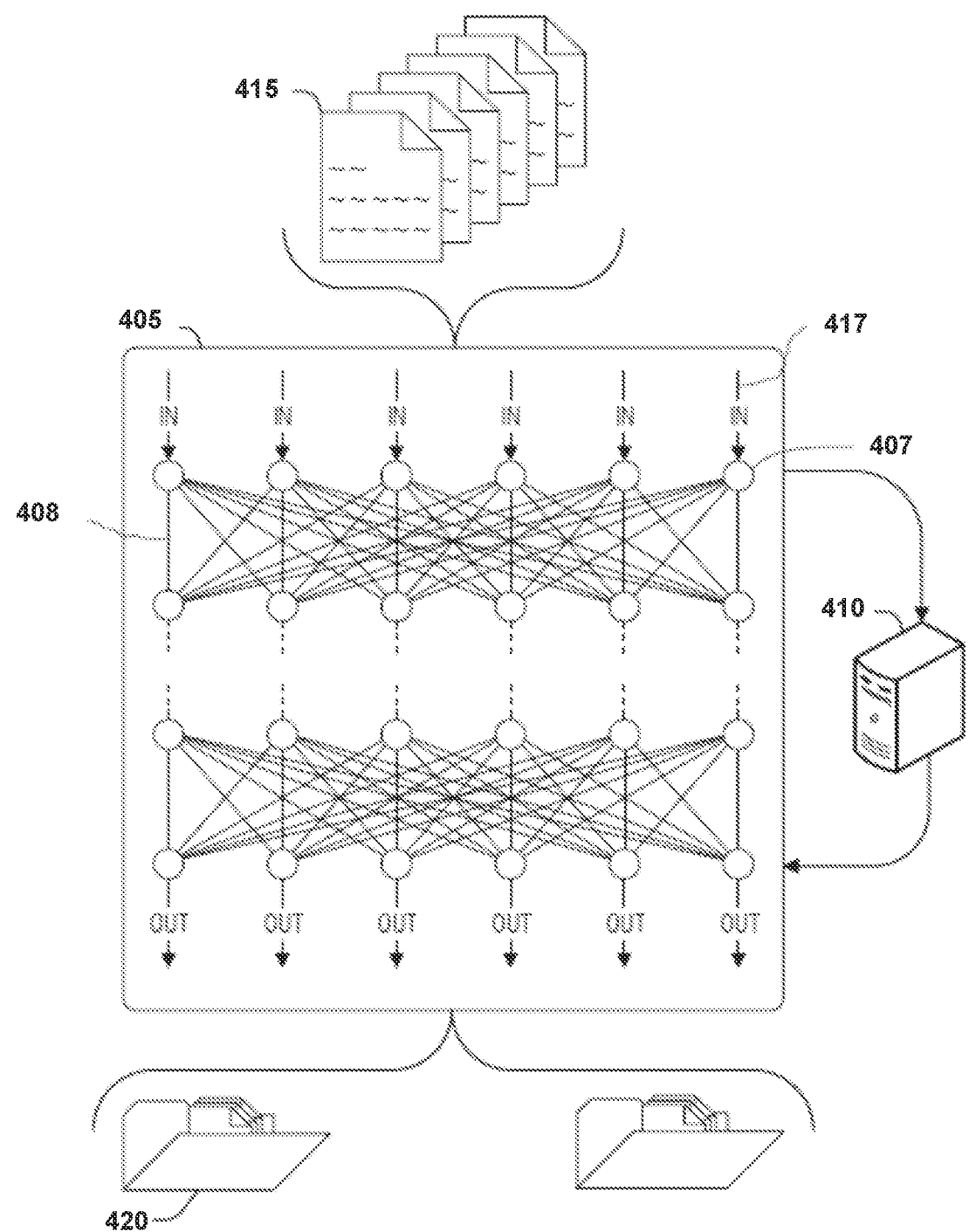
FIG. 4 illustrates, by way of example, a block diagram of an embodiment of an environment including a system for neural network training.

FIG. 4 illustrates, by way of example, a block diagram of an embodiment of an environment including a system for neural network training. AI is a field concerned with developing decision-making systems to perform cognitive tasks that have traditionally required a living actor, such as a person. ANNs are computational structures that are loosely modeled on biological neurons. Generally, ANNs encode information (e.g., data or decision making) via weighted connections (e.g., synapses) between nodes (e.g., neurons). ANNs are foundational to many AI applications, such as speech recognition.

Many ANNs are represented as matrices of weights that correspond to the modeled connections. ANNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the ANN graph-if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most ANNs relies on accurate weights. However, ANN designers do not generally know which weights will work for a given application. ANN designers typically choose a number of neuron layers or specific connections between layers including circular connections. A training process may be used to determine appropriate weights by selecting initial weights. In some examples, the initial weights may be randomly selected. Training data is fed into the ANN and results are compared to an objective function that provides an indication of error. The error indication is a measure of how wrong the ANN's result is compared to an expected result. This error is then used to correct the weights. Over many iterations, the weights will collectively converge to encode the operational data into the ANN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the ANN—here "forward" means that the data starts at the input neurons and follows the directed graph of neuron connections until the output neurons are reached—and the objective function is applied backwards through the ANN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of ANNs. Any well-known optimization algorithm for back propagation may be used, such as stochastic gradient descent (SGD), Adam, etc.

FIG. 4 is a block diagram of an example of an environment including a system for neural network training, according to an embodiment. The system can aid in training of a cyber security solution according to one or more embodiments. The system includes an ANN 405 that is trained using a processing node 410. The processing node 410 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 405, or even different nodes 407 within layers. Thus, a set of processing nodes 410 is arranged to perform the training of the ANN 405.

The set of processing nodes 410 is arranged to receive a training set 415 for the ANN 405. The ANN 405 comprises a set of nodes 407 arranged in layers (illustrated as rows of nodes 407) and a set of inter-node weights 408 (e.g., parameters) between nodes in the set of nodes. In an example, the training set 415 is a subset of a complete training set. Here, the subset may enable processing nodes with limited storage resources to participate in training the ANN 405.

The training data may include multiple numerical values representative of a domain, such as a word, symbol, other part of speech, or the like. Each value of the training or input 417 to be classified once ANN 405 is trained, is provided to a corresponding node 607 in the first layer or input layer of ANN 405. The values propagate through the layers and are changed by the objective function.

As noted above, the set of processing nodes is arranged to train the neural network to create a trained neural network. Once trained, data input into the ANN will produce valid classifications 420 (e.g., the input data 417 will be assigned into categories), for example. The training performed by the set of processing nodes 407 is iterative. In an example, each iteration of the training the neural network is performed independently between layers of the ANN 405. Thus, two distinct layers may be processed in parallel by different members of the set of processing nodes. In an example, different layers of the ANN 405 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 407 (e.g., neurons) are trained independently. In an example, the nodes are trained on different hardware.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus (e.g., a programmable processor, a computer, or multiple computers).

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and
Machine-Readable Medium (e.g., Storage Device)

Figure 5:
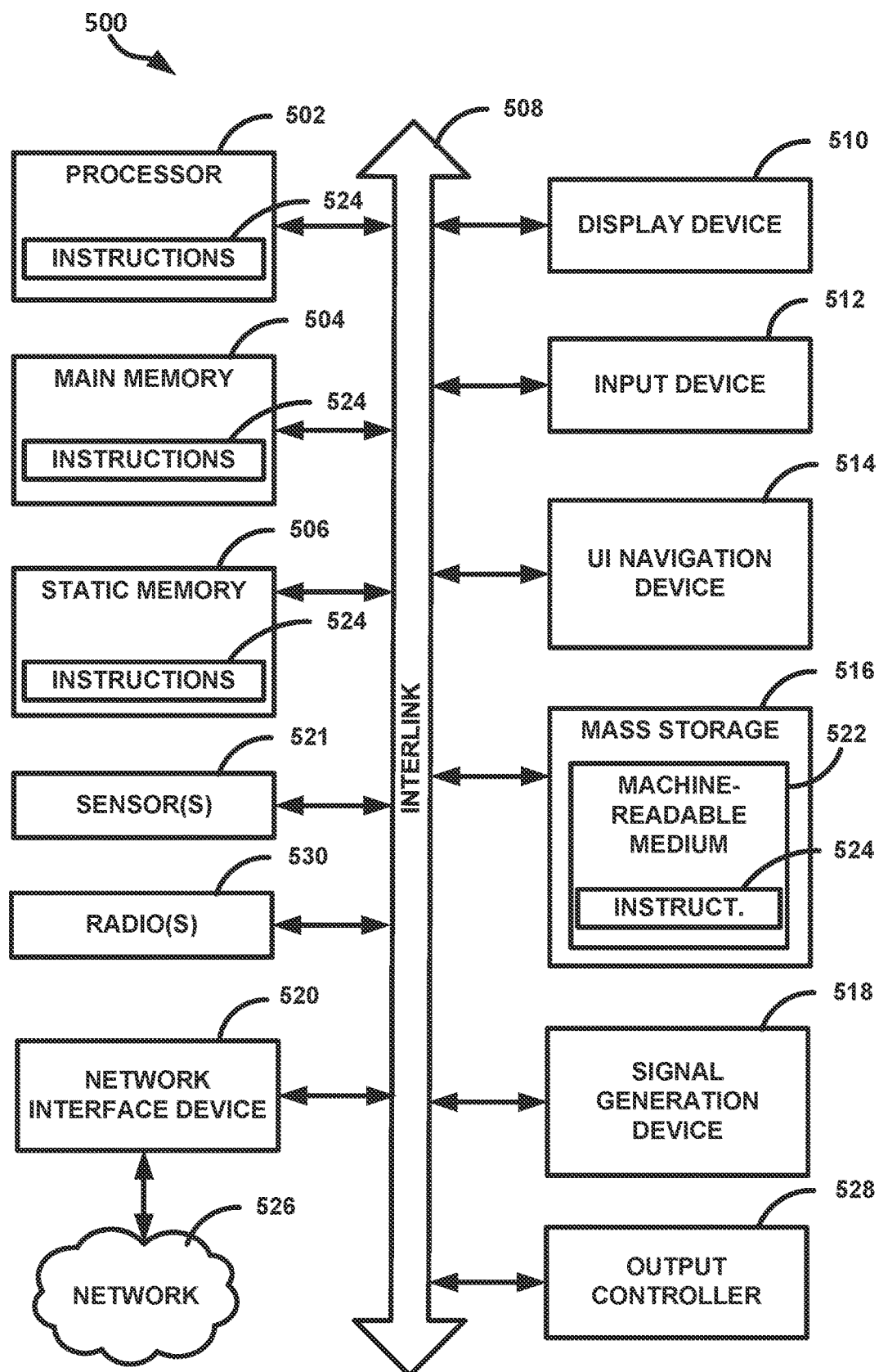
FIG. 5 illustrates, by way of example, a block diagram of an embodiment of a machine in the example form of a computer system within which instructions, for causing the machine to perform any one or more of the methodologies discussed herein, may be executed.

FIG. 5 illustrates, by way of example, a block diagram of an embodiment of a machine in the example form of a computer system 500 within which instructions, for causing the machine to perform any one or more of the methodologies discussed herein, may be executed. One or more of can be implemented or performed by the computer system 500. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, sensors 521 (e.g., a transducer that converts one form of energy (e.g., light, heat, electrical, mechanical, or other energy) to another form of energy), such as an IR, SAR, SAS, visible, or other image sensor, or the like, or a combination thereof), or the like, or a combination thereof), a main memory 504 and a static memory 506, which communicate with each other via a bus 508. The memory 504, 506 can store parameters (sometimes called weights) that define operations of the processing circuitry 104, monitor 106, or other component of the system 500. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker), a network interface device 520, and radios 530 such as Bluetooth, WWAN, WLAN, and NFC, permitting the application of security controls on such protocols.

The machine 500 as illustrated includes an output controller 528. The output controller 528 manages data flow to/from the machine 500. The output controller 528 is sometimes called a device controller, with software that directly interacts with the output controller 528 being called a device driver.

Machine-Readable Medium

The disk drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504, the static memory 506, and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Additional Example

Example 1 can include a computer-implemented method for dynamic visualization of machine learning (ML) model performance on a graphical user interface (GUI), the method comprising receiving a series of data indicating accuracy and confidence associated with classification of respective batches of input samples, and dynamically displaying a concurrent plot of the accuracy and confidence as the series of data are received.

In Example 2, Example 1 can further include receiving, by an artificial drift control of the GUI, data indicating a transformation, before providing the input samples to the ML model, applying the transformation to a batch of input samples of the input samples resulting in transformed input samples, providing the transformed input samples to the ML model, receiving data indicating the confidence and accuracy of the ML model with the transformed input samples as input, and dynamically displaying the plot of the accuracy and confidence to reflect the received data.

In Example 3, at least one of Examples 1-2 can further include, wherein confidence and accuracy are both displayed on a same plot.

In Example 4, at least one of Examples 1-3 can further include dynamically displaying, concurrently with the plot of confidence and accuracy, a one, two, or three dimensional plot of a projection of feature vectors of the input.

In Example 5, Example 4 can further include, wherein the plot of the feature vectors includes a visual encoding of the input by class.

In Example 6, at least one of Examples 2-5 can further include dynamically displaying a visualization of the transformed input samples on the GUI concurrently with the plot of the confidence and accuracy.

In Example 7, at least one of Examples 1-6 can further include receiving, by a clear control of the GUI, data indicating to clear the plot of confidence and accuracy, dynamically clearing the plot of the accuracy and confidence to include no data points, receiving a further series of data indicating accuracy and confidence associated with classification of respective batches of input samples, and dynamically displaying a concurrent plot of the accuracy and confidence as the further series of data are received.

In Example 8, at least one of Examples 1-7 can further include receiving, by an epochs control of the GUI, data indicating a number of epochs to further train the ML model, receiving, by a start control of the GUI, data indicating to begin further training of the ML model, and further training the ML model.

In Example 9, Example 8 can further include receiving, by a stop control of the GUI, data indicating stop the further training of the ML model, and dynamically halting the further training of the ML model irrespective of the number of epochs.

Example 10 includes a non-transitory machine-readable medium including instructions that, when executed by a machine, cause the machine to perform operations for dynamic visualization of machine learning (ML) model performance on a graphical user interface (GUI), the operations comprising receiving a series of data indicating accuracy and confidence associated with classification of respective batches of input samples, and dynamically displaying, on the GUI, a concurrent plot of the accuracy and confidence as the series of data are received.

In Example 11, Example 10 can further include, wherein the operations further comprise receiving, by an artificial drift control of the GUI, data indicating a transformation, before providing the input samples to the ML model, applying the transformation to a batch of input samples of the input samples resulting in transformed input samples, providing the transformed input samples to the ML model, receiving data indicating the confidence and accuracy of the ML model with the transformed input samples as input, and dynamically displaying, on the GUI, the plot of the accuracy and confidence to reflect the received data.

In Example 12, at least one of Examples 10-11 can further include, wherein confidence and accuracy are both displayed on a same plot.

In Example 13, at least one of Examples 10-12 can further include, wherein the operations further comprise dynamically displaying, on the GUI and concurrently with the plot of confidence and accuracy, a one, two, or three dimensional plot of a projection of feature vectors of the input.

In Example 14, Example 13 can further include, wherein the plot of the feature vectors includes a visual encoding of the input by class.

In Example 15, at least one of Examples 11-14 can further include, wherein the operations further comprise dynamically displaying a visualization of the transformed input samples on the GUI concurrently with the plot of the confidence and accuracy.

In Example 16, at least one of Examples 10-15 can further include, wherein the operations further comprise receiving, by a clear control of the GUI, data indicating to clear the plot of confidence and accuracy, dynamically clearing the plot of the accuracy and confidence to include no data points, receiving a further series of data indicating accuracy and confidence associated with classification of respective batches of input samples, and dynamically displaying a concurrent plot of the accuracy and confidence as the further series of data are received.

In Example 17, at least one of Examples 10-16 can further include, wherein the operations further comprise receiving, by an epochs control of the GUI, data indicating a number of epochs to further train the ML model, receiving, by a start control of the GUI, data indicating to begin further training of the ML model, and further training the ML model.

In Example 18, Example 17 can further include, wherein the operations further comprise receiving, by a stop control of the GUI, data indicating stop the further training of the ML model, and dynamically halting the further training of the ML model irrespective of the number of epochs.

Example 19 can include a system comprising a graphical user interface (GUI), processing circuitry coupled to the GUI and a memory including instructions that, when executed by the processing circuitry, cause the processing circuitry to perform operations for dynamic visualization of machine learning (ML) model performance on the GUI, the method comprising the method of one of Examples 1-9.

Although teachings have been described with reference to specific example teachings, it will be evident that various modifications and changes may be made to these teachings without departing from the broader spirit and scope of the teachings. Accordingly, the specification and drawings are to be regarded in an illustrative rather than a restrictive sense. The accompanying drawings that form a part hereof, show by way of illustration, and not of limitation, specific teachings in which the subject matter may be practiced. The teachings illustrated are described in sufficient detail to enable those skilled in the art to practice the teachings disclosed herein. Other teachings may be utilized and derived therefrom, such that structural and logical substitutions and changes may be made without departing from the scope of this disclosure. This Detailed Description, therefore, is not to be taken in a limiting sense, and the scope of various teachings is defined only by the appended claims, along with the full range of equivalents to which such claims are entitled.

What is claimed is:

1. A computer-implemented method for dynamic visualization of trained machine learning (ML) model performance on a graphical user interface (GUI), the method comprising:
   receiving, from a user and by a user-adjustable artificial drift control of the GUI, data indicating a transformation to be applied to input samples;
   applying the transformation to the input samples resulting in transformed input samples;
   providing the transformed input samples to a trained ML model;
   receiving data indicating the confidence and accuracy of the trained ML model with the transformed input samples as input, the confidence provided by the trained ML model and indicating an expected accuracy of a respective classifications by the trained ML model; and
   dynamically displaying a concurrent plot of the accuracy and confidence to reflect the received data and as the received data are received.

2. The method of claim 1, wherein the transformation includes rotation, scaling, stretching, twisting, pixelating, downsampling or voiding, noise injection, or a combination thereof; and
   the artificial drift control includes a slider.

3. The method of claim 2, further comprising dynamically displaying a visualization of the transformed input samples on the GUI concurrently with the plot of the confidence and accuracy.

4. The method of claim 1, wherein confidence and accuracy are both displayed on a same plot.

5. The method of claim 1, further comprising dynamically displaying, concurrently with the plot of confidence and accuracy, a one, two, or three dimensional plot of a projection of feature vectors of the input.

6. The method of claim 5, wherein the plot of the feature vectors includes a visual encoding of the input by class.

7. The method of claim 1, further comprising:
   receiving, by a clear control of the GUI, data indicating to clear the plot of confidence and accuracy;
   dynamically clearing the plot of the accuracy and confidence to include no data points;
   receiving a further series of data indicating accuracy and confidence associated with classification of respective batches of input samples; and
   dynamically displaying a concurrent plot of the accuracy and confidence as the further series of data are received.

8. The method of claim 1, further comprising:
receiving, by an epochs control of the GUI, data indicating a number of epochs to further train the trained ML model;
receiving, by a start control of the GUI, data indicating to begin further training of the trained ML model; and
further training the trained ML model.

9. The method of claim 8, further comprising:
receiving, by a stop control of the GUI, data indicating stop the further training of the trained ML model; and
dynamically halting the further training of the trained ML model irrespective of the number of epochs.

10. A non-transitory machine-readable medium including instructions that, when executed by a machine, cause the machine to perform operations for dynamic visualization of trained machine learning (ML) model performance on a graphical user interface (GUI), the operations comprising:
receiving, from a user and by a user-adjustable artificial drift control of the GUI, data indicating a transformation to be applied to input samples;
applying the transformation to the input samples resulting in transformed input samples;
providing the transformed input samples to a trained ML model;
receiving data indicating the confidence and accuracy of the trained ML model with the transformed input samples as input, the confidence provided by the trained ML model and indicating an expected accuracy of a respective classifications by the trained ML model; and
dynamically displaying, on the GUI, a concurrent plot of the accuracy and confidence to reflect the received data as the received data are received.

11. The non-transitory machine-readable medium of claim 10, wherein:
the transformation includes rotation, scaling, stretching, twisting, pixelating, downsampling or voiding, noise injection, or a combination thereof; and
the artificial drift control includes a slider.

12. The non-transitory machine-readable medium of claim 11, wherein the operations further comprise dynamically displaying a visualization of the transformed input samples on the GUI concurrently with the plot of the confidence and accuracy.

13. The non-transitory machine-readable medium of claim 10, wherein confidence and accuracy are both displayed on a same plot.

14. The non-transitory machine-readable medium of claim 10, wherein the operations further comprise dynamically displaying, on the GUI and concurrently with the plot of confidence and accuracy, a one, two, or three dimensional plot of a projection of feature vectors of the input.

15. The non-transitory machine-readable medium of claim 14, wherein the plot of the feature vectors includes a visual encoding of the input by class.

16. The non-transitory machine-readable medium of claim 10, wherein the operations further comprise:
receiving, by a clear control of the GUI, data indicating to clear the plot of confidence and accuracy;
dynamically clearing the plot of the accuracy and confidence to include no data points;
receiving a further series of data indicating accuracy and confidence associated with classification of respective batches of input samples; and
dynamically displaying a concurrent plot of the accuracy and confidence as the further series of data are received.

17. The non-transitory machine-readable medium of claim 10, wherein the operations further comprise:
receiving, by an epochs control of the GUI, data indicating a number of epochs to further train the trained ML model;
receiving, by a start control of the GUI, data indicating to begin further training of the trained ML model; and
further training the trained ML model.

18. The non-transitory machine-readable medium of claim 17, wherein the operations further comprise:
receiving, by a stop control of the GUI, data indicating stop the further training of the trained ML model; and
dynamically halting the further training of the trained ML model irrespective of the number of epochs.

19. A system comprising:
a graphical user interface (GUI); processing circuitry coupled to the GUI;
a memory including instructions that, when executed by the processing circuitry, cause the processing circuitry to perform operations for dynamic visualization of trained machine learning (ML) model performance on the GUI, the method comprising:
receiving, from a user and by a user-adjustable artificial drift control of the GUI, data indicating a transformation to be applied to input samples;
applying the transformation to the input samples resulting in transformed input samples;
providing the transformed input samples to a trained ML model;
receiving data indicating the confidence and accuracy of the trained ML model with the transformed input samples as input, the confidence provided by the trained ML model and indicating an expected accuracy of the respective classifications by the trained ML model; and
dynamically displaying, on the GUI, a concurrent plot of the accuracy and confidence to reflect the received data as the received data are received.

20. The system of claim 19, wherein:
the transformation includes rotation, scaling, stretching, twisting, pixelating, downsampling or voiding, noise injection, or a combination thereof;
the artificial drift control includes a slider.

* * * * *